US012809515B2

(12) United States Patent
Matsuzawa et al.

(10) Patent No.: US 12,809,515 B2
(45) Date of Patent: Nov. 24, 2026

(54) MANAGEMENT SYSTEM AND ERROR CODE MANAGEMENT METHOD FOR STORAGE DEVICE

(71) Applicant: Hitachi Vantara, Ltd., Kanagawa-ken (JP)

(72) Inventors: Keiichi Matsuzawa, Tokyo (JP); Mitsuo Hayasaka, Tokyo (JP)

(73) Assignee: Hitachi Vantara, Ltd., Kanagawa-ken (JP)

( * ) Notice: Subject to any disclaimer, the term of this patent is extended or adjusted under 35 U.S.C. 154(b) by 111 days.

(21) Appl. No.: 18/826,896

(22) Filed: Sep. 6, 2024

(65) Prior Publication Data

US 2025/0156070 A1 May 15, 2025

(30) Foreign Application Priority Data

Nov. 15, 2023 (JP) ................................ 2023-194559

(51) Int. Cl.
*G06F 3/06* (2006.01)

(52) U.S. Cl.
CPC .......... *G06F 3/0604* (2013.01); *G06F 3/0619* (2013.01); *G06F 3/0653* (2013.01); *G06F 3/067* (2013.01)

(58) Field of Classification Search
CPC .... G06F 3/0604; G06F 3/0619; G06F 3/0653; G06F 3/067
See application file for complete search history.

(56) References Cited

U.S. PATENT DOCUMENTS

| | | | | |
|---|---|---|---|---|
| 10,558,514 | B2 * | 2/2020 | D | G06F 11/0706 |
| 2010/0217944 | A1 * | 8/2010 | DeHaan | G06F 1/3203 711/E12.001 |

* cited by examiner

*Primary Examiner* — Hosain T Alam
*Assistant Examiner* — Allan Otto
(74) *Attorney, Agent, or Firm* — Procopio, Cory, Hargreaves & Savitch LLP

(57) ABSTRACT

An upper API processing device that manages a storage device providing an API for operating a plurality of storage devices holds an error correspondence table indicating a correspondence relationship between specific error information represented in a specific format for each model of the storage device and common error information represented in a common format among models of the storage device. The upper API processing device calls and executes the API with respect to the storage device in response to a call request from the terminal. When the specific error information is responded from the API in response to the call request, the upper API processing device converts the specific error information into the common error information based on the error correspondence table and returns the common error information to the terminal.

9 Claims, 12 Drawing Sheets

FIG. 5

500

| | LOWER API TYPE (510) | CONVERSION SOURCE ERROR CODE (511) | CONVERSION DESTINATION ERROR CODE (512) | MEANING (513) |
|---|---|---|---|---|
| 520 | StorageX | 1234 | VolumeLocked | VOLUME IS LOCKED |
| 521 | StorageX | 6789 | VolumeBlockade | VOLUME IS BLOCKADED |
| 522 | StorageY | ER_BLOCKADE | VolumeBlockade | VOLUME IS BLOCKADED |
| 523 | StorageZ | VolumeBusy | VolumeBusy | VOLUME IS BUSY |
| 524 | StorageZ | CPUError | CPUError | ABNORMALITY OCCURS IN CPU |

MANAGEMENT SYSTEM AND ERROR CODE MANAGEMENT METHOD FOR STORAGE DEVICE

CROSS REFERENCE TO RELATED APPLICATIONS

This application claims priority to Japanese Patent Application No. 2023-194559, filed Nov. 15, 2023, the contents of which are incorporated herein by reference in its entirety for all purposes.

BACKGROUND OF THE INVENTION

1. Field of the Invention

The present invention relates to a management system and an error code management method for a storage device.

2. Description of the Related Art

In the storage market, so-called hybrid cloud storage is increasingly used, in which an on-premises storage device owned by a customer and a storage service on a public cloud are used in cooperation.

In the management of the hybrid cloud storage, a plurality of bases, models, and services are to be managed. At that time, regarding an application programming interface (API) used for management operation of each model, presence/absence, meaning, and effect of functions and parameters included in the API are different for each model.

In a case where an infrastructure administrator centrally manages the hybrid cloud storage, it is necessary for the infrastructure administrator to grasp all the specifications of the plurality of models of APIs, and extensive knowledge of the storage device is required, and the educational cost and the implementation cost are high. In particular, the API response at the time of an error has a large difference in specification for each model and API, and the number of types of errors is several hundreds and thousands, and thus the error handling is particularly costly.

PTL1 discloses a conventional technique for uniformly handling errors in different APIs. The related art disclosed in PTL1 realizes uniform handling of errors by converting the schema of the API error response into a common schema.

CITATION LIST

Patent Literature

PTL 1: U.S. Pat. No. 10,558,514

SUMMARY OF THE INVENTION

However, in the conventional technique disclosed in PTL1, only by commonizing a schema, contents of errors (error code, error message, and the like) are not unified, and still remain different between models.

The present invention has been made in view of the above circumstances, and an object of the present invention is to reduce types of error information of responses returned by a plurality of models of APIs in hybrid cloud storage management, and to facilitate handling by an API user.

According to one aspect of the present invention, a management system, which manages a storage device providing an application programming interface (API) for operating a plurality of storage devices, includes a processor, and a storage unit. The storage unit holds correspondence information indicating a correspondence relationship between specific error information indicating error information in a specific format for each model of the storage device and common error information indicating error information in a common format among models of the storage device. The processor is configured to: call and execute the API with respect to the storage device in response to a call request from a terminal; when the specific error information is responded from the API in response to the call request, convert the specific error information into the common error information on a basis of the correspondence information; and respond the converted common error information to the terminal.

According to the present invention, in hybrid cloud storage management, it is possible to reduce the types of error information of responses returned by a plurality of models of APIs and to facilitate handling by API users.

BRIEF DESCRIPTION OF THE DRAWINGS

FIG. 5 is a diagram illustrating an example of an error conversion table according to the first embodiment;

DESCRIPTION OF THE PREFERRED EMBODIMENTS

Figure 1:
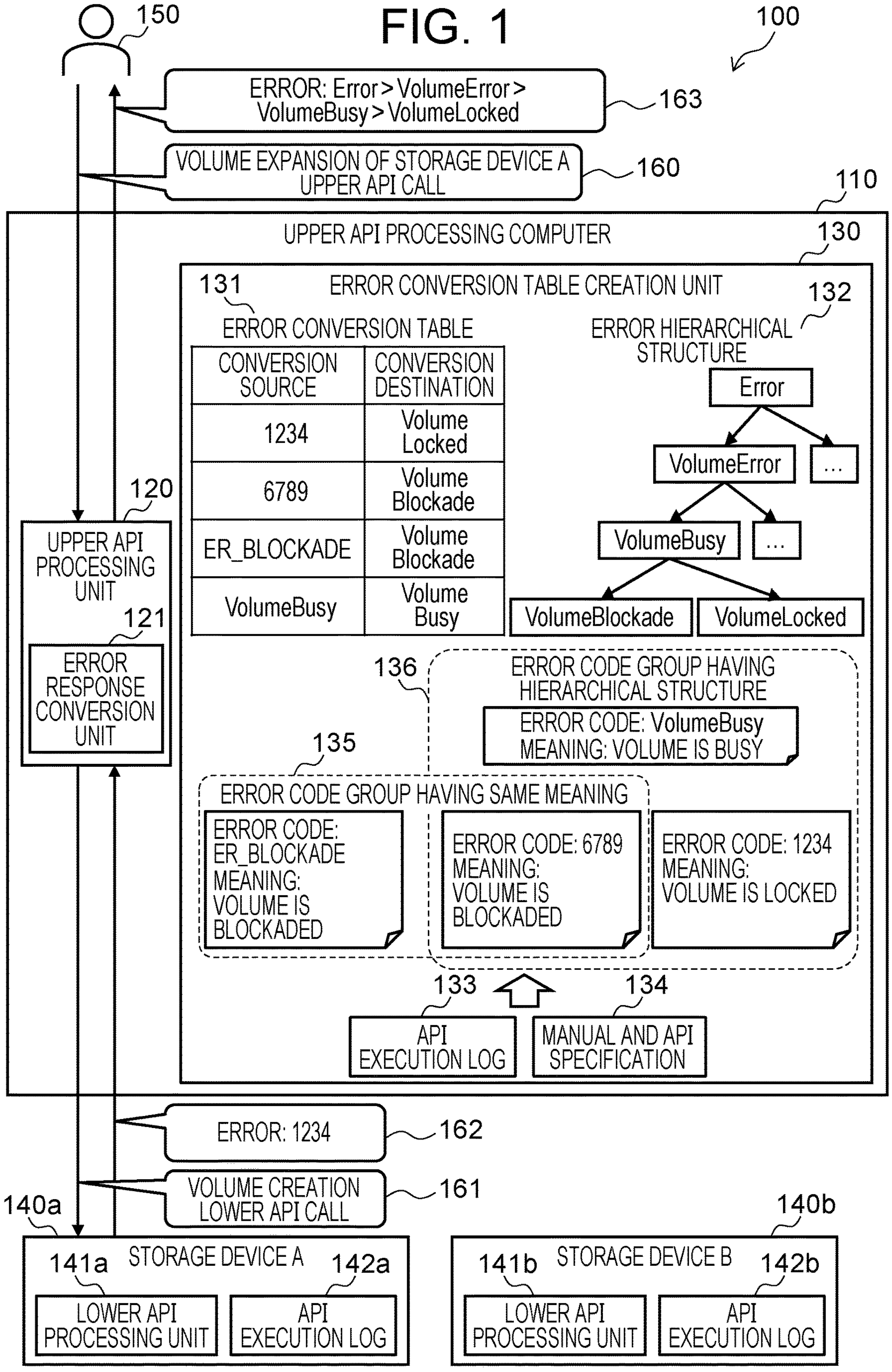
FIG. 1 is a diagram illustrating a configuration of a hybrid cloud storage according to a first embodiment.

In the following description, a "central processing unit (CPU)" is an example of one or more processor devices. Typically, the at least one processor device is not limited to the CPU, and may be another type of processor device such as a graphics processing unit (GPU). At least one processor device may be configured by a single core, or multiple cores. At least one processor device may be a processor core.

The at least one processor device may be a circuit that is a collection of gate arrays in a hardware description language that performs some or all of the processing. The circuit is, for example, a processor device in a broad sense such as a field programmable gate array (FPGA), an application specific integrated circuit (ASIC), a complex programmable logic device (CPLD), or the like.

In addition, in the following description, a process may be described mainly by a "yyy program". In this case, the program is executed by the CPU to realize a processing function called "yyy functional unit", and serves as a processing execution subject. The processing function may be realized by executing one or more computer programs by a processor, may be realized by one or more hardware circuits (for example, FPGA or ASIC), or may be realized by a combination thereof.

When the function is realized by the program being executed by the processor, a predetermined process is performed while appropriately using a storage device and/or an interface device, and thus the function may be at least part of the processor. The process described with the functional unit as the subject may be a process performed by a processor or a device having the processor.

The program may be installed from a program source. The program source may be, for example, a program distribution computer or a computer-readable recording medium (for example, a non-transitory recording medium). The description of each function is an example, and a plurality of functions may be combined into one function, or one function may be divided into a plurality of functions. The "yyy functional unit" may be referred to as a "yyy unit".

Further, in the following description, in a case where the same type of elements is referred without distinction, a common symbol of the reference symbols may be used. In a case where the same type of elements is described in distinction, the reference numeral may be used.

First Embodiment (Configuration of Hybrid Cloud Storage System 100 According to First Embodiment)

FIG. 1 is a diagram illustrating a configuration of a hybrid cloud storage system 100 according to a first embodiment. The hybrid cloud storage system 100 includes an upper API processing computer 110, storage devices 140*a* (storage device A) and 140*b* (storage device B), and an infrastructure administrator 150. The infrastructure administrator 150 manages the storage devices 140*a* and 140*b* via the upper API processing computer 110.

The upper API processing computer 110 is an example of a management system, and is a computer that provides an upper API for managing the storage devices 140*a* and 140*b*. The upper API processing computer 110 includes an upper API processing unit 120.

The upper API processing unit 120 is a processing unit that provides an upper API, receives an upper API call (call request) 160 from the infrastructure administrator 150, and issues a lower API call 161 to the storage devices 140*a* and 140*b*. The upper API processing unit 120 includes an error response conversion unit 121. When the upper API is called, the upper API processing unit 120 makes the lower API call 161 according to the model of the corresponding storage devices 140*a* and 140*b*.

When lower API processing units 141*a* and 141*b* of the storage devices 140*a* and 140*b* respond to an error response 162, the error response conversion unit 121 converts the error response into an upper API response 163 using an error conversion table 131 and error hierarchical structure information 132. The error response 162 is an example of specific error information. The upper API response 163 is an example of the common error information.

Then, the error response conversion unit 121 returns the upper API response 163 to the infrastructure administrator 150. The specific error information is error information (error message) in a specific format for each model of the storage device 140. The common error information is error information (error message) in a common format among models of the storage device 140.

Note that the infrastructure administrator 150 does not directly communicate with the upper API processing computer 110, but actually calls the upper API to the upper API processing computer 110 through another computer possessed by the infrastructure administrator 150. However, here, for convenience, the "infrastructure administrator 150" is expressed as the subject of the call.

An error conversion table creation unit 130 creates the error conversion table 131 and the error hierarchical structure information 132. The error conversion table creation unit 130 includes an API execution log 133 and a manual and API specification 134. The error conversion table creation unit 130 classifies error codes unique to each model into an error code group 135 having the same meaning and an error code group 136 having a hierarchical structure using the API execution log 133 and the manual and API specification 134. The error conversion table 131 and the error hierarchical structure information 132 are created from this classification. The error conversion table 131 is an example of correspondence information indicating a correspondence relationship between specific error information and common error information. The API execution log 133 is an example of a log related to specific error information.

The storage devices 140*a* and 140*b* are computers that store data. The lower API processing units 141*a* and 141*b* provide APIs for changing the settings of the storage devices 140*a* and 140*b*, and perform settings according to the lower API call 161. API execution logs 142*a* and 142*b* are a list of histories of lower API calls called in the past.

FIG. 1 illustrates an example in which when the infrastructure administrator 150 instructs volume expansion of the storage device 140*a* (storage device A) by the upper API call 160, the error response 162 (error code: 1234) is returned from the storage device 140*a*. In this example, the error response 162 is converted into the upper API response 163 "Error>Volume Error>Volume Busy>Volume Locked" (error because the volume is locked) by conversion of the error response conversion unit 121.

Hereinafter, individual elements constituting the hybrid cloud storage system 100 and a processing flow will be described in detail.

(Configuration of Upper API Processing Computer 110 According to First Embodiment)

Figure 2:
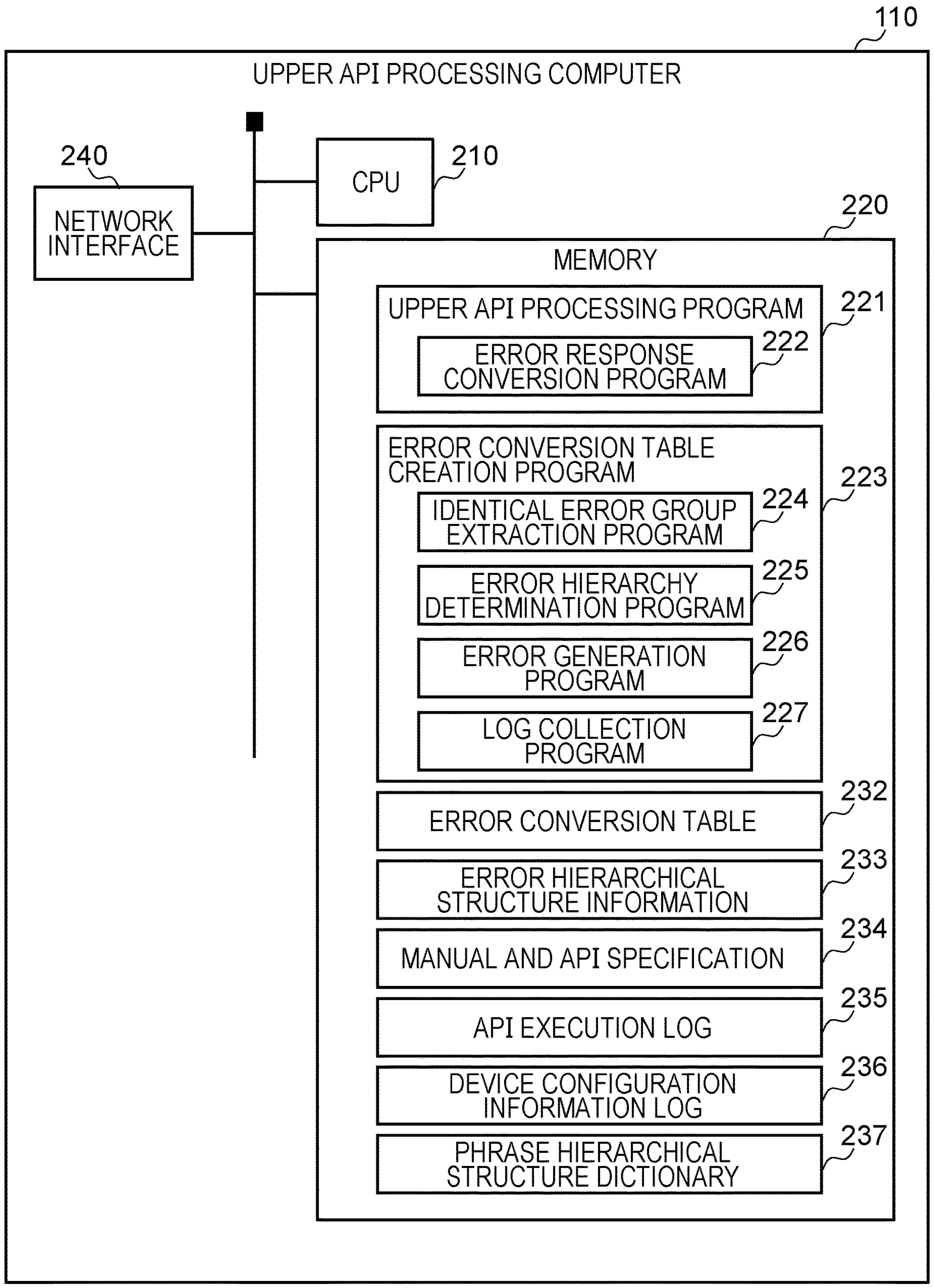
FIG. 2 is a diagram illustrating a configuration of an upper API processing computer according to the first embodiment.

FIG. 2 is a diagram illustrating a configuration of the upper API processing computer 110 according to the first embodiment.

The upper API processing computer 110 includes a CPU 210, a memory 220, and a network interface 240. The CPU 210 determines the operation of the upper API processing computer 110 according to various programs stored in the memory 220. The memory 220 is an example of the storage unit.

Hereinafter, the expression that the program operates means that the CPU 210 operates according to various programs.

The memory 220 stores an upper API processing program 221, an error response conversion program 222, an error conversion table creation program 223, and an identical error group extraction program 224. The memory 220 also stores an error hierarchy determination program 225, an error generation program 226, and a log collection program 227. The memory 220 also stores an error conversion table 232, error hierarchical structure information 233, a manual and API specification 234, an API execution log 235, and a device configuration information log 236. The error conversion table 232 is an example of correspondence information indicating a correspondence relationship between specific error information and common error information.

The upper API processing program 221 is a program that provides the infrastructure administrator 150 with an upper API and calls a lower API in response to the upper API call. The error response conversion program 222 is a program that converts error information included in the response of the lower API into common error information of the upper API with reference to the error conversion table 232 and the error hierarchical structure information 233 and returns the common error information to the caller of the upper API.

The error conversion table creation program 223 is a program that creates the error conversion table 232 and the error hierarchical structure information 233.

The error conversion table creation program 223 internally includes the identical error group extraction program 224, the error hierarchy determination program 225, and the error generation program 226. The identical error group extraction program 224 refers to the API execution log 235 or the manual and API specification 234 and extracts a plurality of pieces of different error information having the same meaning. The error hierarchy determination program 225 refers to the manual and API specification 234, the API execution log 235, and the device configuration information log 236, determines a hierarchical structure in a plurality of pieces of error information, and creates the error hierarchical structure information 233.

The log collection program 227 is a program that collects the API execution log/device configuration information log held by each storage device as the API execution log 235 and the device configuration information log 236 in the upper API processing computer.

The manual and API specification 234 describes specifications of lower APIs in a natural language or a structured format. The API execution log 235 is a collection of API execution logs 142*a* and 142*b* held by the storage devices 140*a* and 140*b*. The device configuration information log 236 holds configuration information of the storage device 140 in time series. A phrase hierarchical structure dictionary 237 is a dictionary that represents an inclusion relationship of natural language expressions as a hierarchical structure. The phrase hierarchical structure dictionary 237 is used in a second embodiment.

The network interface 240 is used when communicating with another computer. For communication, a protocol such as transmission control protocol/Internet protocol (TCP/IP) or hypertext transfer protocol (HTTP) constructed on TCP/IP can be used. For example, a representational state transfer (REST) API using HTTP can be used for accepting an upper API and issuing a lower API.

All of the programs and data included in the upper API processing computer 110 may not be arranged in a single computer but may be distributed and arranged in a plurality of computers. For example, the upper API processing program 221 and the error conversion table creation program 223 may operate on different computers. In this case, the error conversion table 232 and the error hierarchical structure information 233 created by the error conversion table creation program 223 may be copied between computers and used by the upper API processing program 221 in the other computers.

The error conversion table 232, the error hierarchical structure information 233, the manual and API specification 234, and the API execution log 235 may be stored in a place other than the memory 220 accessible from the program of the upper API processing computer 110. For example, the information may be stored in a non-volatile storage medium such as a hard disk, a solid state drive (SSD), or a digital versatile disc (DVD), or may be stored in a database constructed on another computer.

(Configuration of Storage Device 140 According to First Embodiment)

Figure 3:
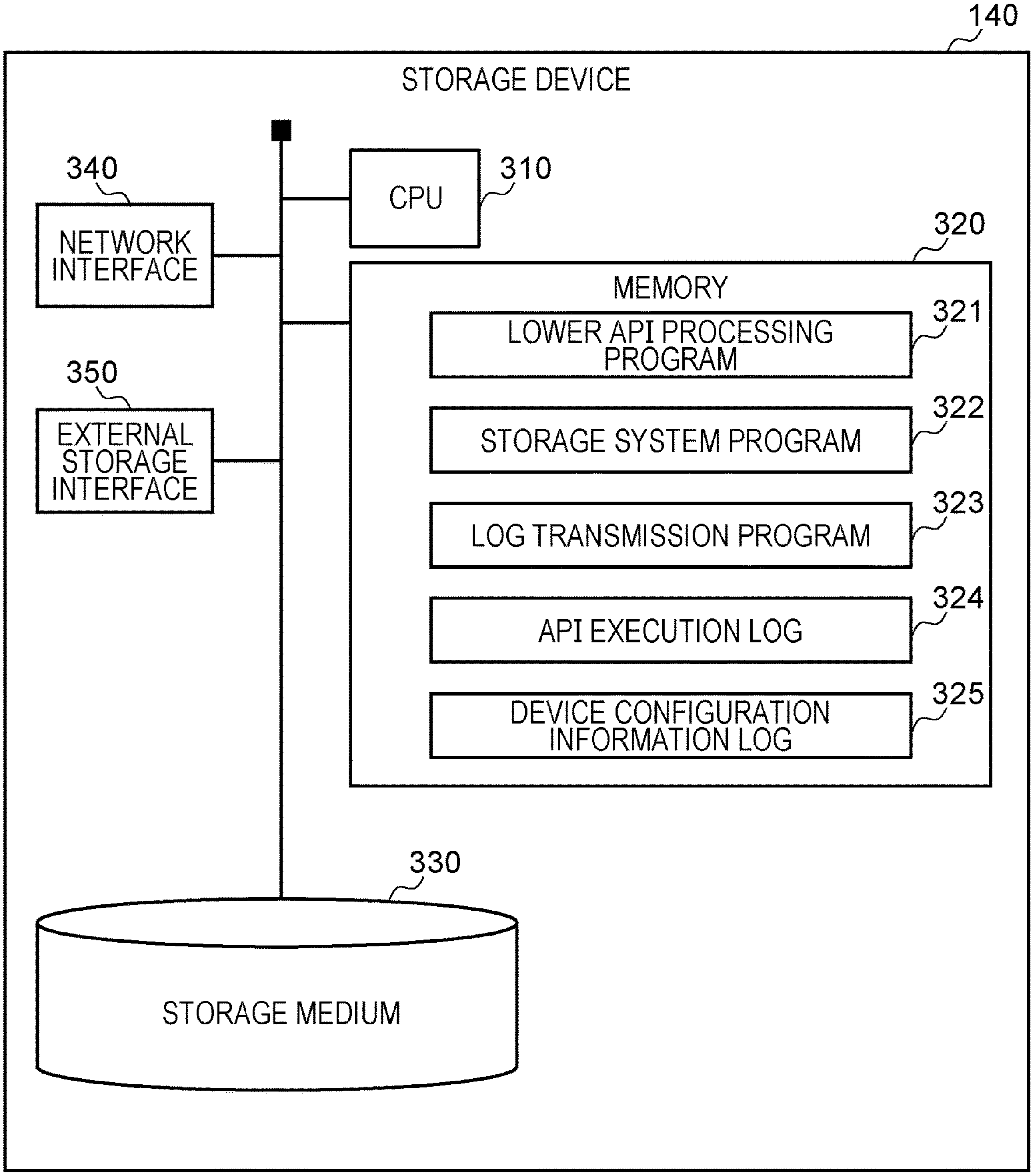
FIG. 3 is a diagram illustrating a configuration of a storage device according to the first embodiment.

FIG. 3 is a diagram illustrating a configuration of the storage device 140 according to the first embodiment. The storage device 140 is a device that stores and processes data in accordance with a request from another computer. The behavior of the storage device 140 is changed depending on the lower API.

The storage device 140 includes a CPU 310, a memory 320, a storage medium 330, a network interface 340, and an external storage interface 350. The CPU 310 determines the operation of the storage device 140 according to various programs stored in the memory 320.

The memory 320 stores a lower API processing program 321, a storage system program 322, a log transmission program 323, an API execution log 324, and a device configuration information log 325.

The lower API processing program 321 is a program that receives a call of the lower API and changes the behavior of the storage system program 322 according to the value of the parameter being called. The storage system program 322 is a program that stores and processes data in accordance with a request from another computer. The log transmission program 323 is a program for transmitting the API execution log 324 and the device configuration information log 325 to the upper API processing computer 110. The API execution log 324 is data holding a past lower API call execution history, and is data in which a pair of a called API and a response thereto is recorded in time series. The device configuration information log 325 is data in which the configuration, setting, and error status of the storage device 140 are recorded in time series.

The API execution log 324 and the device configuration information log 325 may be stored in a place other than the memory 320 as long as they can be accessed from each program held in the memory 320. For example, it may be stored in a part of the storage medium 330 or may be stored in a database constructed on another computer.

The storage medium 330 is a device that stores data instructed to be held by another computer. Examples of the storage medium 330 include a non-volatile storage medium such as a hard disk, a solid state drive (SSD), or a digital versatile disc (DVD).

Similarly to the network interface 240, the network interface 340 is used when communicating with another computer.

The external storage interface 350 is used by another computer to issue an instruction to store/process data and transmit/receive target data. Examples of the external storage interface 350 include a host bus adaptor (HBA) compatible with an optical fiber and a small computer system interface (SCSI) target device.

(Example of Error Response of Lower API According to First Embodiment)

Figure 4:
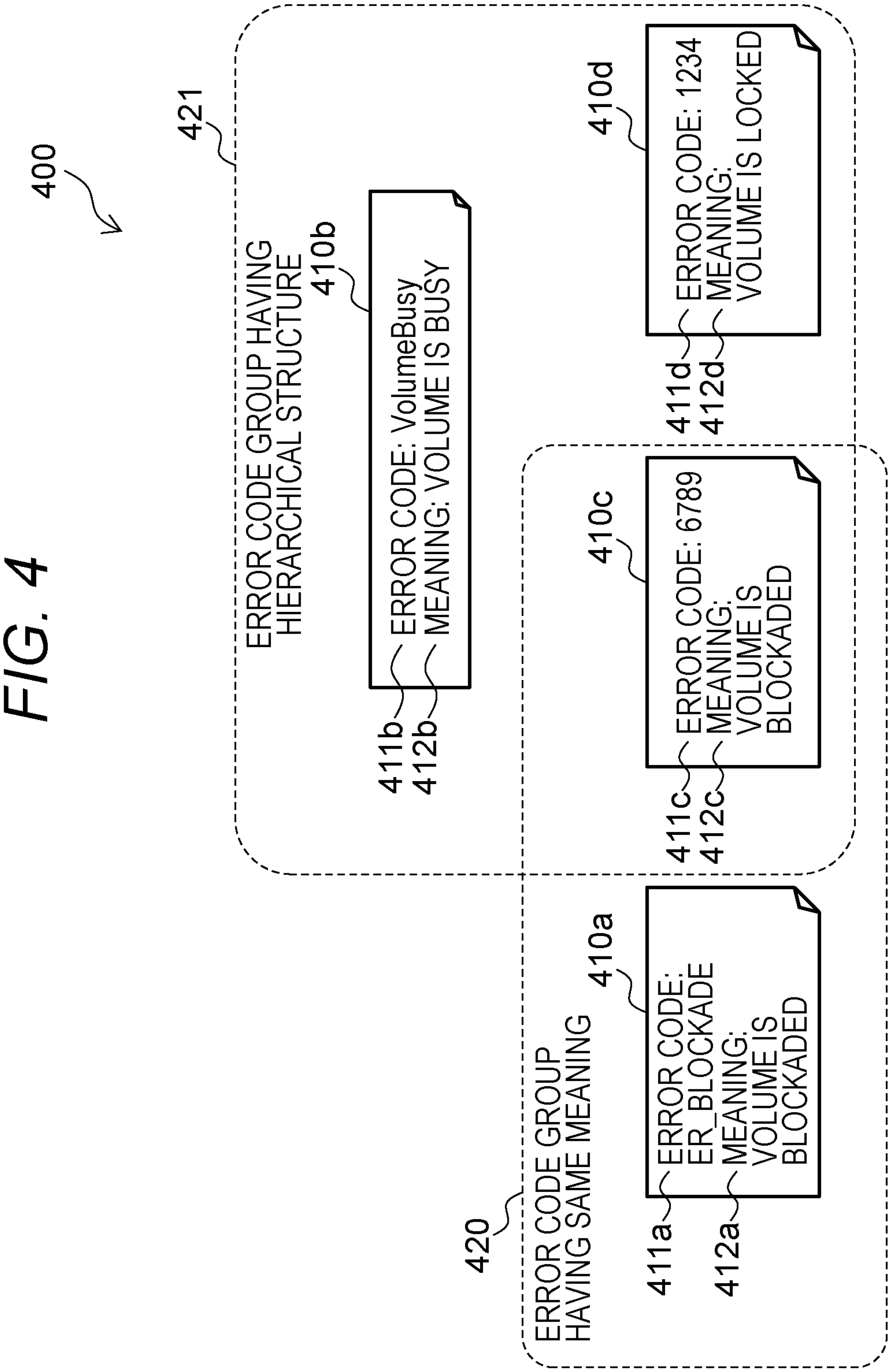
FIG. 4 is a diagram illustrating an example of an error response of a lower API according to the first embodiment.

FIG. 4 is a diagram illustrating an example of an error response of the lower API according to the first embodiment.

The error codes 410*a*, 410*b*, 410*c*, and 410*d* are information included in a response returned by the lower API processing unit 141 when an error occurs. This is information returned when the lower API processing unit 141 cannot complete API call due to an abnormality or the like of the storage device 140.

Each of the error codes 410*a*, 410*b*, 410*c*, and 410*d* includes at least error codes 411*a*, 411*b*, 411*c*, and 411*d* and meanings 412*a*, 412*b*, 412*c*, and 412*d*. The error codes 411*a*, 411*b*, 411*c*, and 411*d* are codes indicating the cause and situation when the API call cannot be completed, and take integer values or character strings. In a single lower API, the error codes 411*a*, 411*b*, 411*c*, 411*d* are unique. The meanings 412*a*, 412*b*, 412*c*, and 412*d* describe the meanings of the errors indicated by the error codes 411*a*, 411*b*, 411*c*, and 411*d* in a natural language or a structured document (HTML, XML, etc.).

In general, the meanings 412*a*, 412*b*, 412*c*, and 412*d* may or may not be included in the error information in the API response. For example, the meaning corresponding to the error code may be described in a manual of the storage device or a specification of the API.

The error codes 410*a*, 410*b*, 410*c*, and 410*d* may have information other than the error codes 411*a*, 411*b*, 411*c*, and 411*d* and the meanings 412*a*, 412*b*, 412*c*, and 412*d*. For example, supplementary information such as a time, a device, a place, and a parameter at which the error occurs may be added.

(Example of Error Conversion Table According to First Embodiment)

FIG. 5 is a diagram illustrating an example of an error conversion table according to the first embodiment.

An error conversion table 500 is a table in which a lower API type 510, a conversion source error code 511, a conversion destination error code 512, and a meaning 513 are listed as items for each error code. In the error conversion table 500, entries 520, 521, 522, 523, and 524 are described as an example of an error code.

The lower API type 510 stores information that can uniquely specify the type of the lower API targeted by each entry. This information can be a character string, a numerical value, or the like. The conversion source error code 511 stores an error code in the lower API corresponding to the lower API type 510. Therefore, the format of the conversion source error code 511 differs depending on the type of the lower API.

The entries 520 and 521 indicate lower API types corresponding to "StorageX", and the conversion source error code 511 takes an integer value. The entry 522 indicates a lower API type corresponding to "StorageY", and the conversion source error code 511 takes an uppercase English word starting with "ER_". The entries 523 and 524 indicate lower API types corresponding to "StorageZ", and the conversion source error code 511 has a format in which a plurality of English words are connected.

The conversion destination error code 512 indicates a common error code returned as a return value of the upper API in a case where the error response conversion program 222 receives error information corresponding to the lower API type 510 and the conversion source error code 511 as a return value of the lower API. The meaning 513 stores the meaning of the error code stored in the conversion destination error code 512 in a form easily understood by a person or a computer such as a natural language or a structured document.

In each entry, a set of the lower API type 510 and the conversion source error code 511 appears only once. On the other hand, the conversion destination error code 512 may match between a plurality of entries. In that case, however, the meaning 513 must also be the same.

(Example of Error Hierarchical Structure Representation According to First Embodiment)

Figure 6:
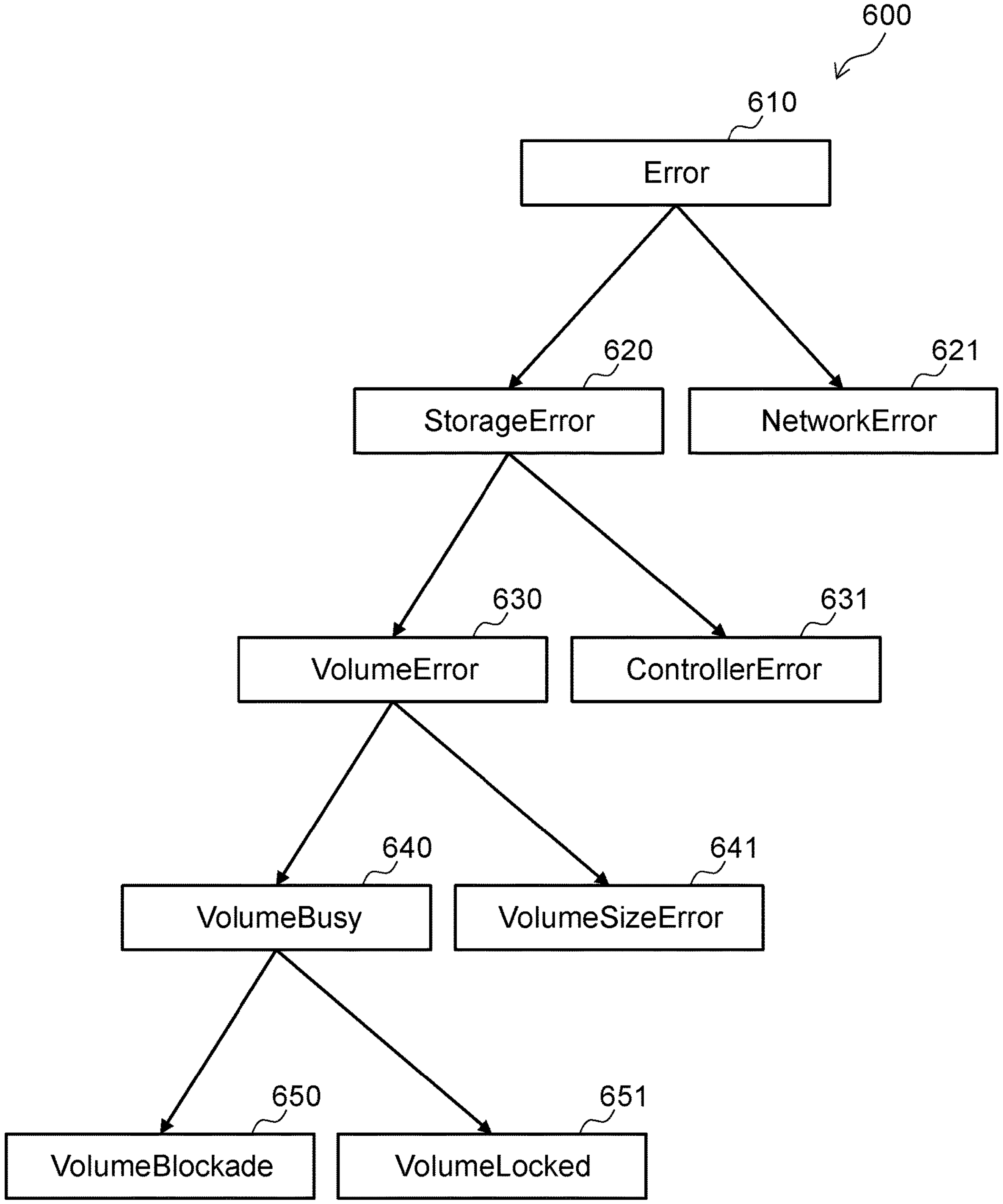
FIG. 6 is a diagram illustrating an example of error hierarchical structure representation according to the first embodiment.

FIG. 6 is a diagram illustrating an example of the error hierarchical structure representation according to the first embodiment.

In an error hierarchical structure example 600, all error codes used in the upper API are expressed in a single tree structure based on a semantic content relationship. In the error hierarchical structure example 600, regarding error codes 610, 620, 621, 630, 631, 640, 641, 650, and 651, an inclusion relationship is indicated by connecting arrows from an upper error to a lower error.

For example, the error code 610 (Error: general error) includes the error code 620 (StorageError: error of the storage device), 621 (NetworkError: network error), and the like. The error code 620 (StorageError: error of the storage device) includes error codes 630 (VolumeError: error of the volume), 631 (ControllerError: error of the storage controller), and the like. The error code 630 (VolumeError: volume error) includes the error codes 640 (VolumeBusy: volume in use), 641 (VolumeSizeError: volume size error), and the like. The error code 640 (VolumeBusy: volume is in use) includes the error codes 650 (VolumeBlockade: volume is blockaded), 651 (VolumeLocked: volume is locked), and the like.

(Error Conversion Table/Hierarchical Structure Creation Processing According to First Embodiment)

Figure 7:
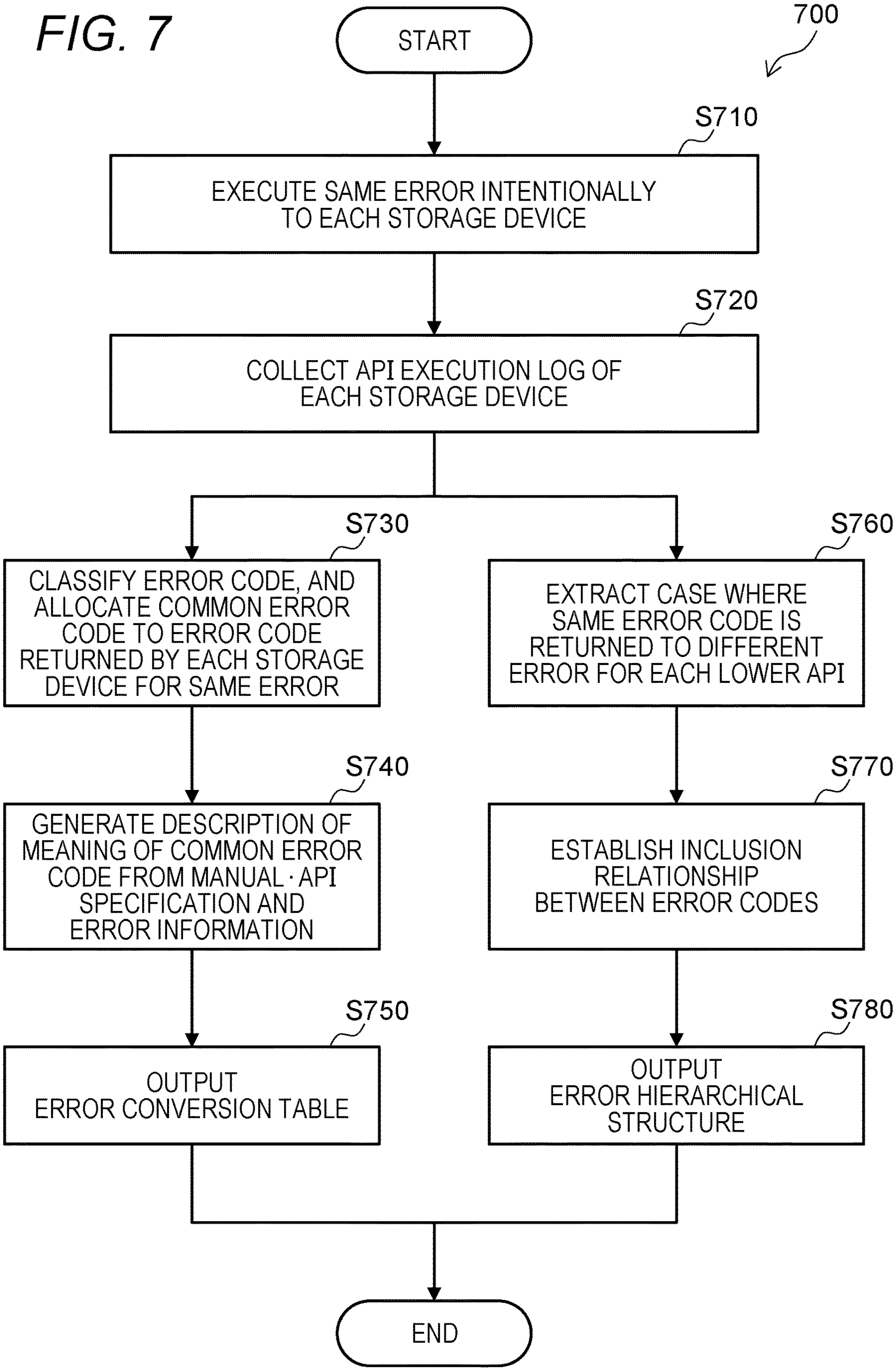
FIG. 7 is a flowchart illustrating error conversion table/hierarchical structure creation processing according to the first embodiment.

FIG. 7 is a flowchart illustrating error conversion table/hierarchical structure creation processing according to the first embodiment.

An error conversion table/hierarchical structure creation flow 700 is a flow executed by the error conversion table creation program 223 of the upper API processing computer 110. The error conversion table/hierarchical structure creation flow 700 can be executed at an arbitrary timing. The processing may be executed before the upper API processing computer 110 starts receiving the upper API by the upper API processing program 221, or may be executed while the upper API processing program 221 is in operation. Examples of executing the error conversion table/hierarchical structure creation flow 700 while the upper API processing program 221 is in operation include a case where the number of types of the storage devices 140 handled by the upper API processing program 221 increases and a case where the specification of the lower API is changed.

First, in step S710, the error generation program 226 calls a lower API that causes the same error to the plurality of storage devices 140. For example, a character string having a length not allowed by the lower API may be specified as a parameter, a capacity exceeding the capacity of the storage medium 330 of the storage device 140 may be specified as a parameter, or the like. The error generation program 226 may perform an operation other than the storage device 140 to cause an error.

For example, the network setting of the hybrid cloud storage system 100 may be changed, the network interface 340 of the storage device 140 may not normally operate, and a lower API for operating the network interface 340 may be called. In step S710, what kind of error has occurred and the execution log of the lower API call are also recorded in the API execution log 235 so that the error that has occurred and the error information returned by the lower API can be collated. Note that the execution of step S710 may be canceled.

Next, in step S720, the error conversion table creation program 223 communicates with the log transmission program 323 of the storage device 140, collects the API execution log 324 of each storage device 140, and aggregates the API execution log as the API execution log 235 of the upper API processing computer 110. The API execution log collected in step S720 may be a log of the lower API call called in step S710 or a log of a lower API call separately called during the operation of the storage device 140.

Next, in steps S730, S740, and S750, the identical error group extraction program 224 generates the error conversion table 232. In steps S760, S770, and S780, the error hierarchy determination program 225 generates the error hierarchical structure information 233. The error conversion table 232 and the error hierarchical structure information 233 can be generated in parallel.

In step S730, the identical error group extraction program 224 classifies the error codes using the logs of the respective lower APIs included in the API execution log 235, and classifies the error codes so that the error codes have the same meaning. The identical error group extraction program 224 also allocates the common error code to an error code group having the same meaning. For example, the error codes 410*a* and 410*c* both indicate that the volumes are blockaded with the meanings 412*a* and 412*c*, and are set to be in the same classification. In addition, "VolumeBlockade" indicating the blockading of volume is allocated as the common error code. In this classification, in the case of the lower API call performed in step S710, error information can be acquired together with the error caused in the API execution log 235, so that error codes included in an error information group in which the caused errors are identical can be classified into the same classification.

For the lower API call performed in the processing other than step S710, the matching classification may be performed between the API execution log 324 and the device configuration information log 325. For example, it is assumed that there is a record indicating that the volume is blockaded in the device configuration information log 325, and there is a record indicating that the error information is returned to the lower API call for operating the volume in the API execution log 324 before and after the volume closure. In this case, it can be determined that the error code in the error information relates to volume blockading.

Next, in step S740, the identical error group extraction program 224 generates a description of meaning for the common error code defined in step S730. The "Description of meaning of common error code" can be generated by extracting an explanation relating to the error code of the lower API to which the common error code is allocated using the manual and API specification 234. Alternatively, in a case where an error message is included in the error information, the error message can be generated by extracting an error message corresponding to the error code of the lower API. The manual and API specification 234 is an example of a specific document. The "Explanation on error code of lower API" is an example of a "Character string related to specific error information for each storage device".

Next, in step S750, the identical error group extraction program 224 outputs the error conversion table 500 based on the contents of steps S730 and S740. The error conversion table 500 is an example of correspondence information indicating a correspondence relationship between specific error information and common error information.

When outputting each entry of the error conversion table 500, the error conversion table creation program 223 stores the type of the lower API in the lower API type 510, and stores the error code of the lower API in the conversion source error code 511. In addition, the error conversion table creation program 223 stores the common error code allocated in step S730 corresponding to the lower API type 510 and the conversion source error code 511 in the conversion destination error code 512. Further, the error conversion table creation program 223 stores the sentence extracted in step S740 corresponding to the common error code in the meaning 513.

For example, the entry 520 indicates an output in a case where the common error code "VolumeLocked" is allocated to the error code "1234" in the lower API of the model corresponding to "StorageX" in step S730. In addition, the entry 520 indicates an output in a case where the meaning of the error code "1234" is found to be "Volume is locked" in step S740.

On the other hand, in step S760, the error hierarchy determination program 225 checks the API execution log 324 and extracts a case where the same error code is returned to a different error. This is performed by comparing error codes between lower APIs. For example, it is assumed that two types of error codes 411*c* and 411*d* are responded to two errors in a model corresponding to "StorageX", and the same error code 411*b* is responded to both errors in a model corresponding to "StorageZ". At this time, the error code 411*b* corresponds to a case where the same error code is responded to different errors.

Next, in step S770, the error hierarchy determination program 225 establishes an inclusion relationship from the error code group extracted in step S760. Since the error code 411*b* is an error code used in both of the two errors to which the error codes 411*c* and 411*d* are responded in other models, it can be determined that the error code 411*b* includes the error codes 411*c* and 411*d*. In practice, "Volume is busy" in the meaning 412*b* is intended to include the meaning 412*c* "Volume is blockaded" and the meaning 412*c* "Volume is locked". The inclusion relationship between the errors is a multiple inclusion relationship, and may constitute a hierarchical structure.

Next, in step S780, the error hierarchy determination program 225 outputs the inclusion relationship established in step S770 as the error hierarchical structure information 233.

(API Call/Error Response Conversion Processing According to First Embodiment)

Figure 8:
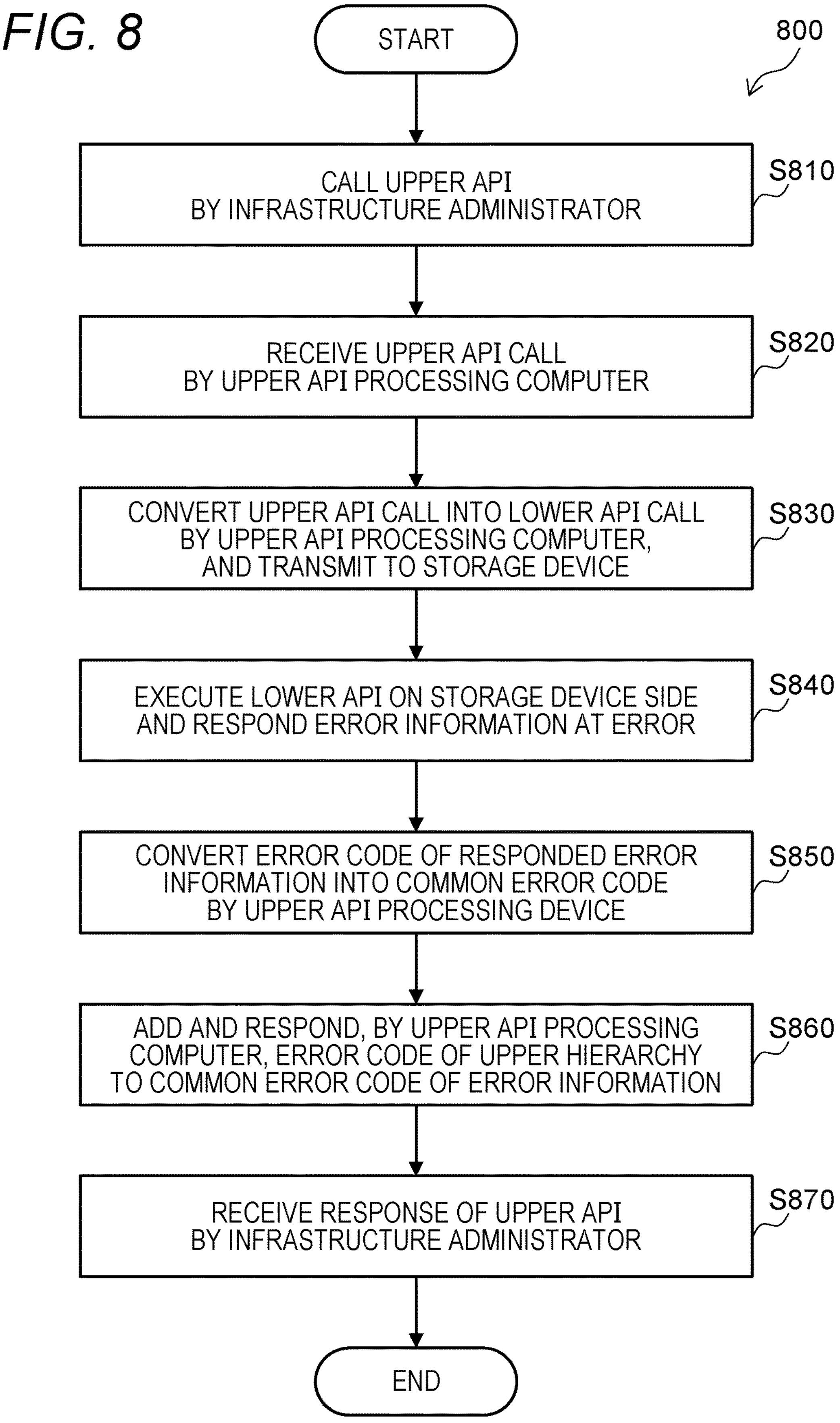
FIG. 8 is a flowchart illustrating API call/error response conversion processing according to the first embodiment.

FIG. 8 is a flowchart illustrating API call/error response conversion processing according to the first embodiment. An API call/error response conversion flow 800 indicates a flow after the infrastructure administrator 150 calls the upper API until a response is obtained.

First, in step S810, the infrastructure administrator 150 makes an upper API call to the upper API processing computer 110. Next, in step S820, the upper API processing program 221 of the upper API processing computer 110 receives an upper API call.

Next, in step S830, the upper API processing program 221 converts the call into a lower API call according to the model of the storage device of the call destination, and transmits the lower API call to the storage device 140. Next, in step S840, the storage device 140 performs processing (change of configuration information of the storage device, or the like) in response to the lower API call. In a case where an error occurs at that time, the lower API processing program 321 responds error information to the lower API call.

Next, in step S850, the upper API processing program 221 converts the error information of the lower API call responded from the lower API processing program 321.

Specifically, an entry in which the lower API type called by the upper API processing program 221 and the error code in the error information match the lower API type 510 and the conversion source error code 511 in the error conversion table 232 is searched. Then, the error code in the error information is converted into the conversion destination error code 512, and the meaning 513 is added to the error information.

For example, a case where the lower API type is "StorageX" and the error code is "1234" is considered. In this case, since the lower API type 510 of the entry 520 and the conversion source error code 511 match, the error code of the error information is converted into "VolumeLocked", and the meaning "Volume is locked" is added.

Next, in step S860, the upper API processing program 221 refers to the error hierarchical structure information 233, adds the common error code of the upper hierarchy of the common error code to the error information, and makes a response. Further, a meaning corresponding to the common error code of the upper hierarchy may be added with reference to the error conversion table 232.

For example, when the error code of the error information is "VolumeLocked", the error code 651 (VolumeLocked) has error codes 640, 630, 620, and 610 in the upper hierarchy according to error hierarchical structure information example 500. Therefore, an error code "Error>StorageError>VolumeError>VolumeBusy>VolumeLocked" in which the error codes are sequentially arranged can be added to the error information.

Next, in step S870, the infrastructure administrator 150 receives the response of the upper API processing program 221 in step S860. When step S870 ends, the API call/error response conversion flow 800 ends.

According to the present embodiment, since the upper API processing unit 120 converts the error code to be responded, the infrastructure administrator 150 has two advantages. The first is that, since the error codes in the plurality of storage models are converted into a single common error code, the types of error codes to be responded to the infrastructure administrator 150 are reduced. As a result, when considering the response to the error code, the infrastructure administrator 150 reduces the trouble.

The second is that since the upper API processing unit 120 responds to the hierarchy of error codes, the infrastructure administrator 150 can determine whether to individually consider detailed error codes. The infrastructure administrator 150 may analyze the cause of the error in detail and check the most detailed error code in the lowest layer when it is desired to resolve the error. On the other hand, in a case where it is desired to grasp only a rough error (for example, whether it is a hardware failure or a parameter problem), it is sufficient to check the error code of the upper hierarchy, and the number of error codes to be considered is reduced.

Second Embodiment

In a second embodiment, a method different from that of the first embodiment will be described in which the error conversion table 232 and the error hierarchical structure information 233 are created.

(Conversion Table/Hierarchical Structure Creation Processing According to Second Embodiment)

Figure 9:
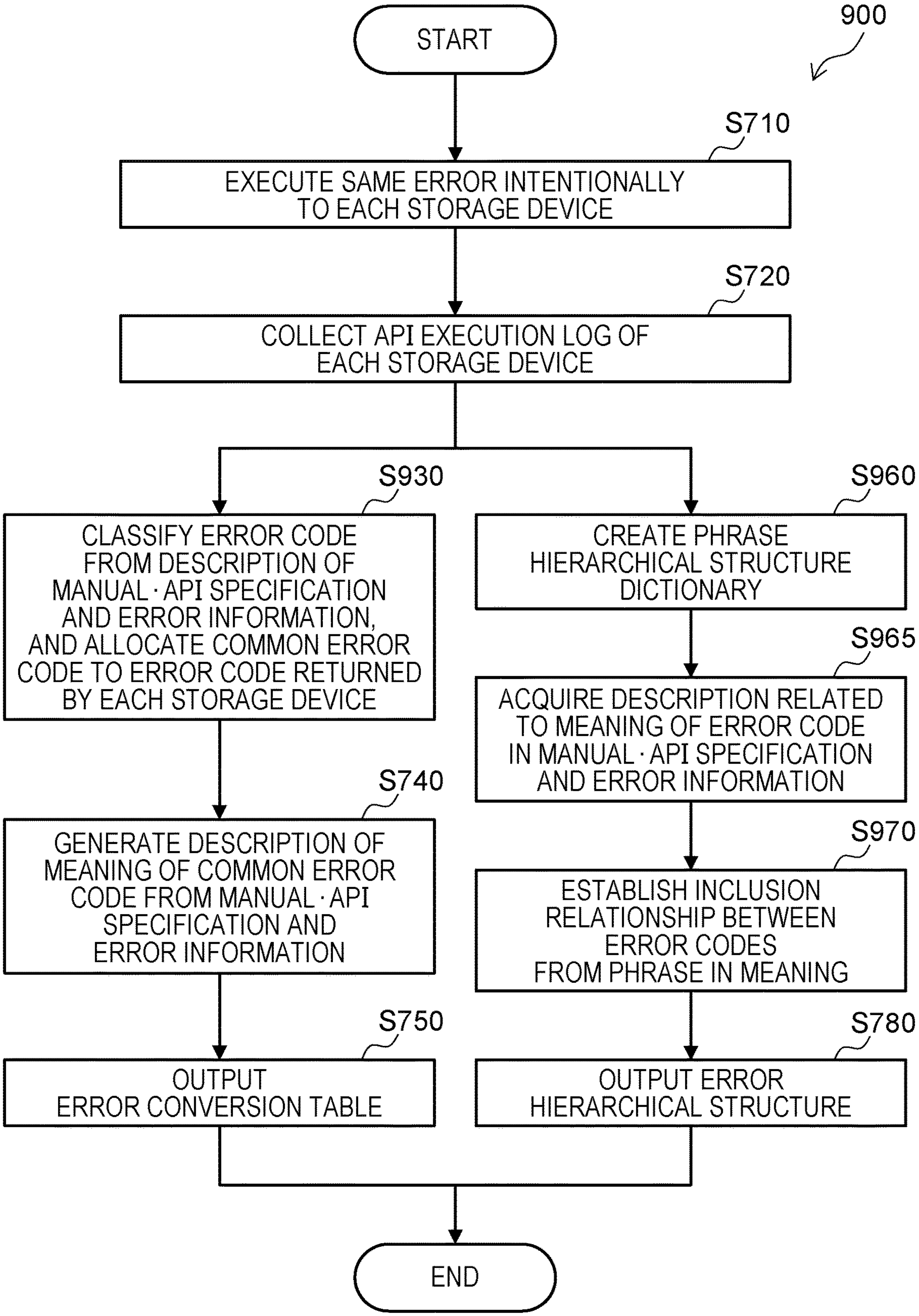
FIG. 9 is a flowchart illustrating conversion table/hierarchical structure creation processing according to a second embodiment.

FIG. 9 is a flowchart illustrating conversion table/hierarchical structure creation processing according to the second embodiment.

An error conversion table/hierarchical structure creation flow 900 is a flow in which step S730 in the error conversion table/hierarchical structure creation flow 700 is replaced with step S930, and steps S760 to S770 are replaced with steps S960, S965, and S970. Hereinafter, only the difference from the error conversion table/hierarchical structure creation flow 700 will be described for the error conversion table/hierarchical structure creation flow 900.

In step S930, the identical error group extraction program 224 classifies the error codes similarly to step S730, and classifies the error codes having the same meaning into the same code. Common error codes are allocated to error code groups having the same meaning. However, the classification method is different from that in step S730.

That is, in step S930, meanings 412*a*, 412*b*, 412*c*, and 412*d* of the error code are used. The identical error group extraction program 224 refers to the manual and API specification 234 or the error information and lists all pairs of error codes and meanings. Among these error code and meaning pairs, those having similar meanings are assigned a common error code as the same classification.

For example, the meaning 412*a* "Volume is blockaded" of the error code 410*a* and the meaning 412*c* "Volume Is Blockaded" of the error code 410*c* are partially different as character strings, but the meanings are the same, and a common error code can be assigned. A general method in natural language processing can be applied to the determination of the similarity in meaning. As an example, there is a method of evaluating the number of characters matching in meaning by an editing distance or a score by bilingual evaluation understudy (BLUE). In another example, a synonym dictionary may be prepared in advance, and meanings including terms that are synonyms may be determined to have the same meaning. In another example, words and sentences describing meanings may be replaced with word embeddings, and similarity between the word embeddings may be calculated.

In step S960 of the error conversion table/hierarchical structure creation flow 900, the error hierarchy determination program 225 creates the phrase hierarchical structure dictionary 237.

As the phrase hierarchical structure dictionary 237 created in step S960, a phrase hierarchical structure dictionary 237 (for example, https://wordnet.princeton.edu/) widely used in the academic field or the like may be used, or may be created by the creator of the upper API. As the phrases 1040, 1050, and 1051 indicate, the inclusion relationship of the phrases may be established only for a specific target, and it is conceivable that such an inclusion relationship is created by a person having knowledge of the storage device.

Next, in step S965, the error hierarchy determination program 225 extracts an explanation related to the error code of the lower API from the manual and API specification 234. Alternatively, the error hierarchy determination program 225 acquires a description of the meaning of the error code in a natural language from the error message included in the error information.

Next, in step S970, the error hierarchy determination program 225 collates a phrase in the meaning of the error code with the phrase hierarchical structure dictionary 237. Then, the error hierarchy determination program 225 determines an error code group using a phrase having a hierarchical relationship on the hierarchical structure as an error code having an inclusion relationship equivalent to the inclusion relationship of the phrase. For example, the error code 410*b* has a meaning 412*b* (volume is busy). In a phrase hierarchical structure dictionary example 1000, "busy" corresponds to the phrase 1020, and includes the phrases 1030 (blockaded) and 1031 (locked). Therefore, it can be determined that the error codes 410*c* and 410*d* having the meaning 412*c* (volume is blockaded) or the meaning 412*d* (volume is locked) are included in the error code 410*b*.

Effects of Second Embodiment

According to the present embodiment, the error conversion table and the error hierarchical structure information can be created from the manual, the API specification, and the error information, and the same effects as those of the first embodiment can be obtained.

Modification of Second Embodiment

The procedure of creating the error conversion table and the error hierarchical structure information of the present embodiment can be executed independently of that of the first embodiment. Therefore, it is also possible to combine the error conversion table and the error hierarchical structure information created in the first embodiment and the present embodiment to create a high-quality error conversion table and error hierarchical structure information. For example, in a case where the error conversion table or the error hierarchical structure information cannot be created by one of the first and second embodiments, it is conceivable to create the error conversion table or the error hierarchical structure information by the other method.

For example, in the first embodiment, an error code (examples: an error that occurs only at a specific timing and has a difficult occurrence condition, an error that requires a physical failure of a device, or the like) that is difficult to generate in an actual machine cannot be covered, but in the second embodiment, the error code can be covered because the actual machine operation is not involved. On the other hand, since terms used are different for each model, there may be an example in which the first embodiment can cope with an error code for which synonym determination cannot be correctly performed in the second embodiment.

Further, when the products of the first embodiment and the second embodiment are at least partially different, it is also conceivable to use the more suitable product according to some criteria. For example, it is conceivable that a human with knowledge of storage compares the products of the two embodiments and takes in the product that is felt naturally.

That is, the specific error information can be converted into the common error information based on the error conversion table 232 created in the first embodiment and/or the second embodiment. Further, on the basis of the error hierarchical structure information 233 created in the first embodiment and/or the second embodiment, the common error information of the upper layer of the common error information can be added to the common error information obtained by converting the specific error information, and a response can be made to the terminal of the infrastructure administrator 150. In this way, the accuracy of the information of the error conversion table 232 and the error hierarchical structure information 233 can be further enhanced, and accordingly, the accuracy of conversion from the specific error information to the common error information can be enhanced, and the information accuracy of the added common error information of the upper layer can be enhanced.

(Example of Phrase Hierarchical Structure Dictionary 237 of Error Message Terms According to Second Embodiment)

Figure 10:
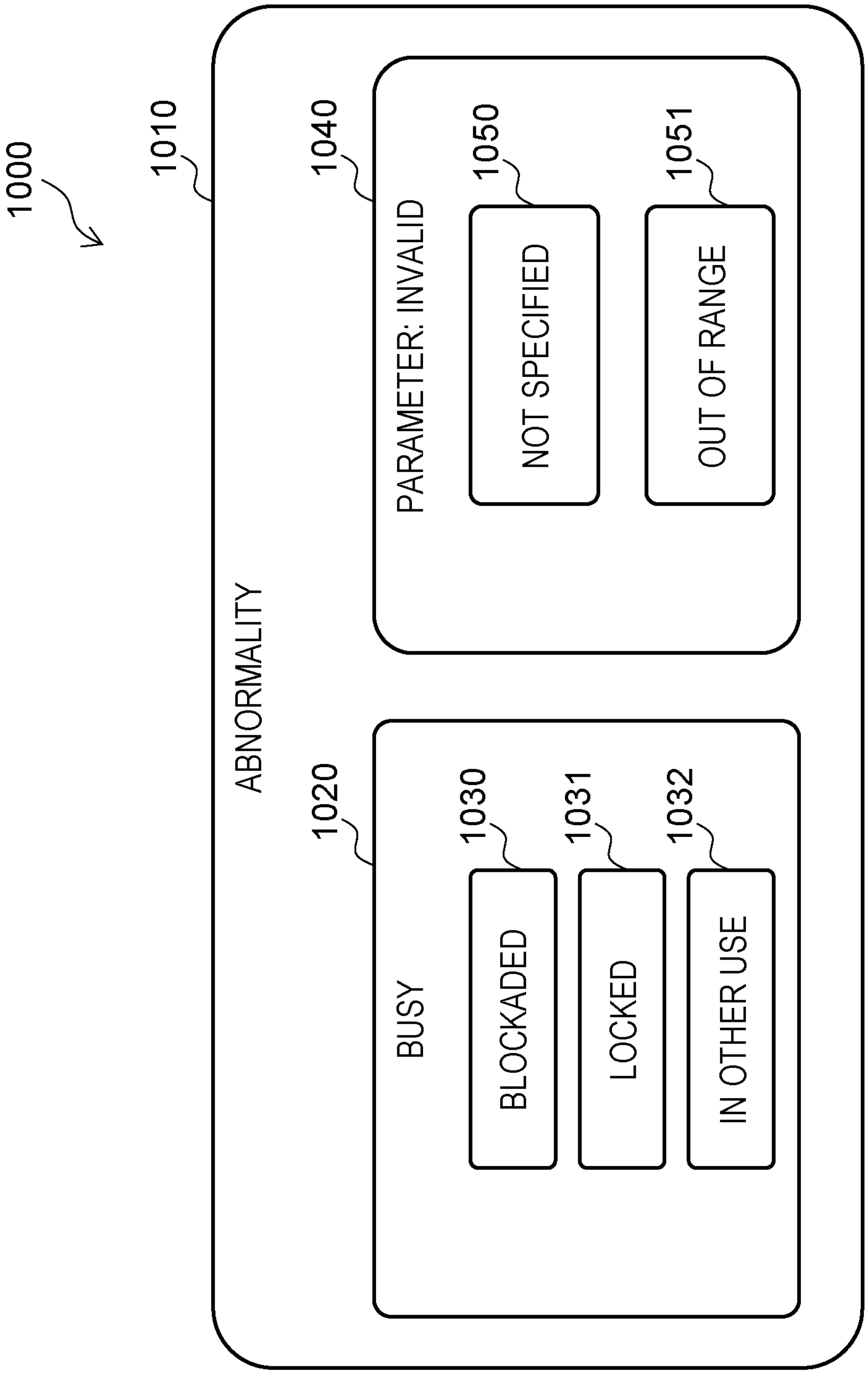
FIG. 10 is a diagram illustrating an example of a hierarchical structure dictionary of error message terms according to the second embodiment.

FIG. 10 is a diagram illustrating an example of the phrase hierarchical structure dictionary 237 of an error message term according to the second embodiment. In the phrase hierarchical structure dictionary example 1000, phrases 1010, 1020, 1030, 1031, 1032, 1040, 1050, and 1051 are described.

The inclusion relationship of the frame to which each phrase corresponds indicates an inclusion relationship of the meaning of the phrase. In addition, this inclusion relationship has a hierarchical structure. The phrase 1020 (busy) and the phrase 1040 (invalid) are part of the phrase 1010 (abnormal), and the phrases 1030 (blockaded), 1031 (locked), 1032 (in multi-use) are part of the phrase 1020 (busy). Also, the phrases 1030 (blockaded), 1031 (locked), 1032 (in multi-use) are part of the phrase 1020 (busy). There may be a hierarchical structure that is valid only for a specific object. Although the phrases 1050 (not specified) and 1051 (out of range) are part of phrase 1040 (invalid), this inclusion relationship holds only when each phrase is used for a parameter.

Third Embodiment

In the first and second embodiments, the error code is classified as a hierarchical structure, but other classification methods may be used. As another classification method, there is a method of adding a tag to an error code according to the meaning of the error code. The tag is a word or an idiom expressing a portion or a factor in which an error has occurred. Even if the infrastructure administrator 150 does not grasp the meaning of a large number of error codes, it is possible to grasp the outline of the error by the tag added to the error code. For example, the meaning 412*c* (volume is blockaded) indicates that there is an abnormality in the volume and the contents other than the abnormality are the blockade. Therefore, a tag "volume" or "blockaded" can be added to the error code 410*c*. Similarly, a tag "volume" and "busy" can be assigned to the error code 410*b*, and a tag "volume" and "locked" can be added to the error code 410*d*.

In the present embodiment, in step S860 of the API call/error response conversion flow 800 (FIG. 8), instead of adding the error code of the upper hierarchy, a tag corresponding to the error information is added and a response is made.

(Error Conversion Table/Tag Information Adding Processing According to Third Embodiment)

Figure 11:
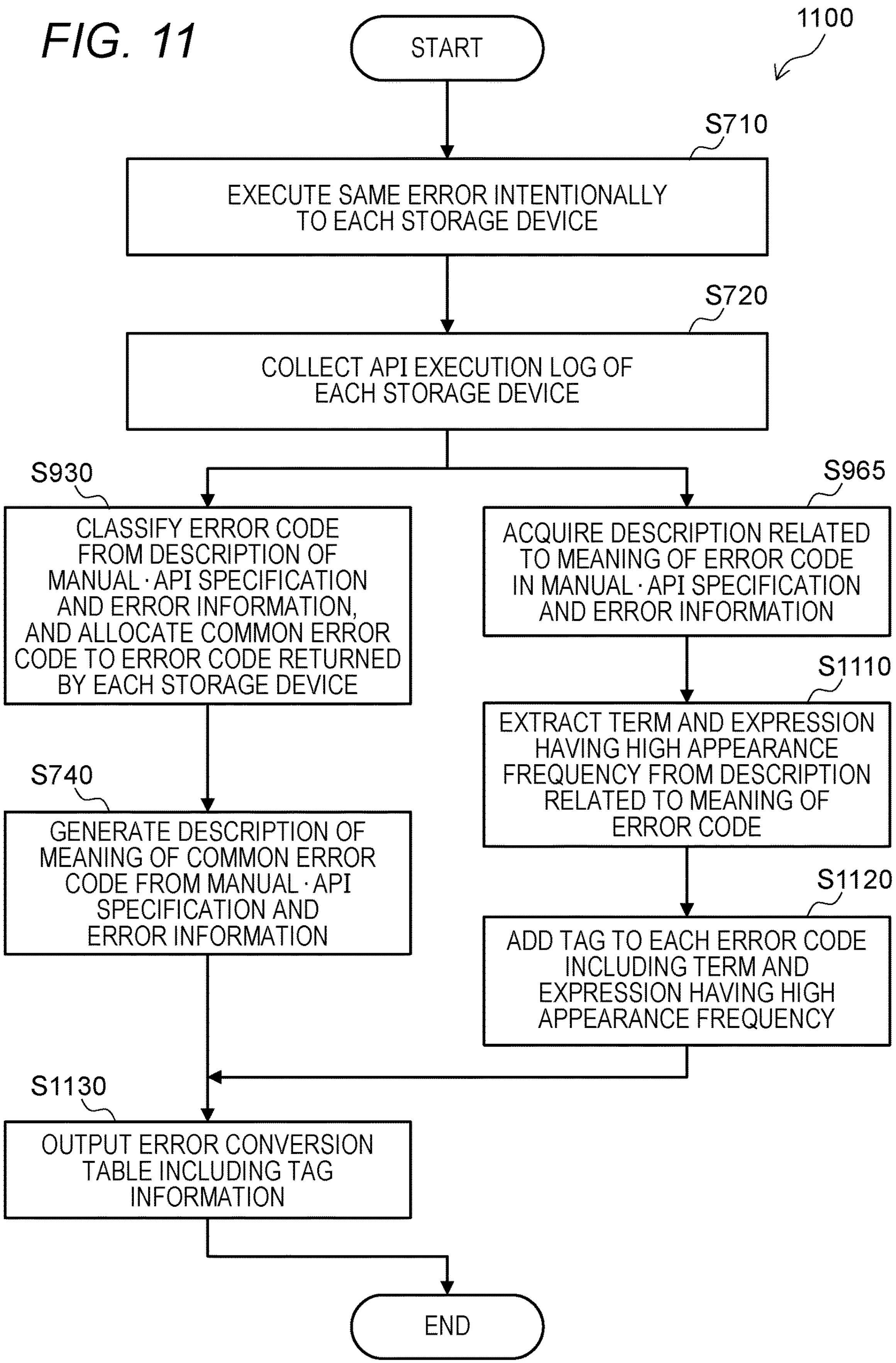
FIG. 11 is a flowchart illustrating error conversion table/tag information adding processing according to a third embodiment.

FIG. 11 is a flowchart illustrating error conversion table/tag information adding processing according to a third embodiment.

In an error conversion table/tag information adding flow 1100, the step related to the creation of the error conversion table 500 is equivalent to the error conversion table/hierarchical structure creation flow 900 in the second embodiment. In the present embodiment, steps S1110, S1120, and S1130, which are processing specific to the error conversion table/tag information adding flow 1100, will be described.

In step S1110, the error hierarchy determination program 225 extracts a term or expression having a high appearance frequency from the meaning of the error code expressed in the natural language obtained in step S965, and uses the term or expression as a tag. As this procedure, for example, a sentence indicating the meaning of an error code can be morphologically analyzed to count the appearance frequency, and a noun or an adjective with high frequency can be extracted. As a result, the terms "volume", "blockaded", "busy", and "locked" described above become tags.

Next, in step S1120, the error hierarchy determination program 225 adds a tag to each error code if there is a term serving as a tag or a synonym thereof in the explanation of the error code.

In step S1130 subsequent to step S740 or S1120, the identical error group extraction program 224 outputs the error conversion table 500. In the present embodiment, in addition to the contents of the error conversion table 500 in the first and second embodiments, the tag information added in step S1120 is added to the error conversion table 500.

(API Call/Error Response Conversion Processing According to Third Embodiment)

Figure 12:
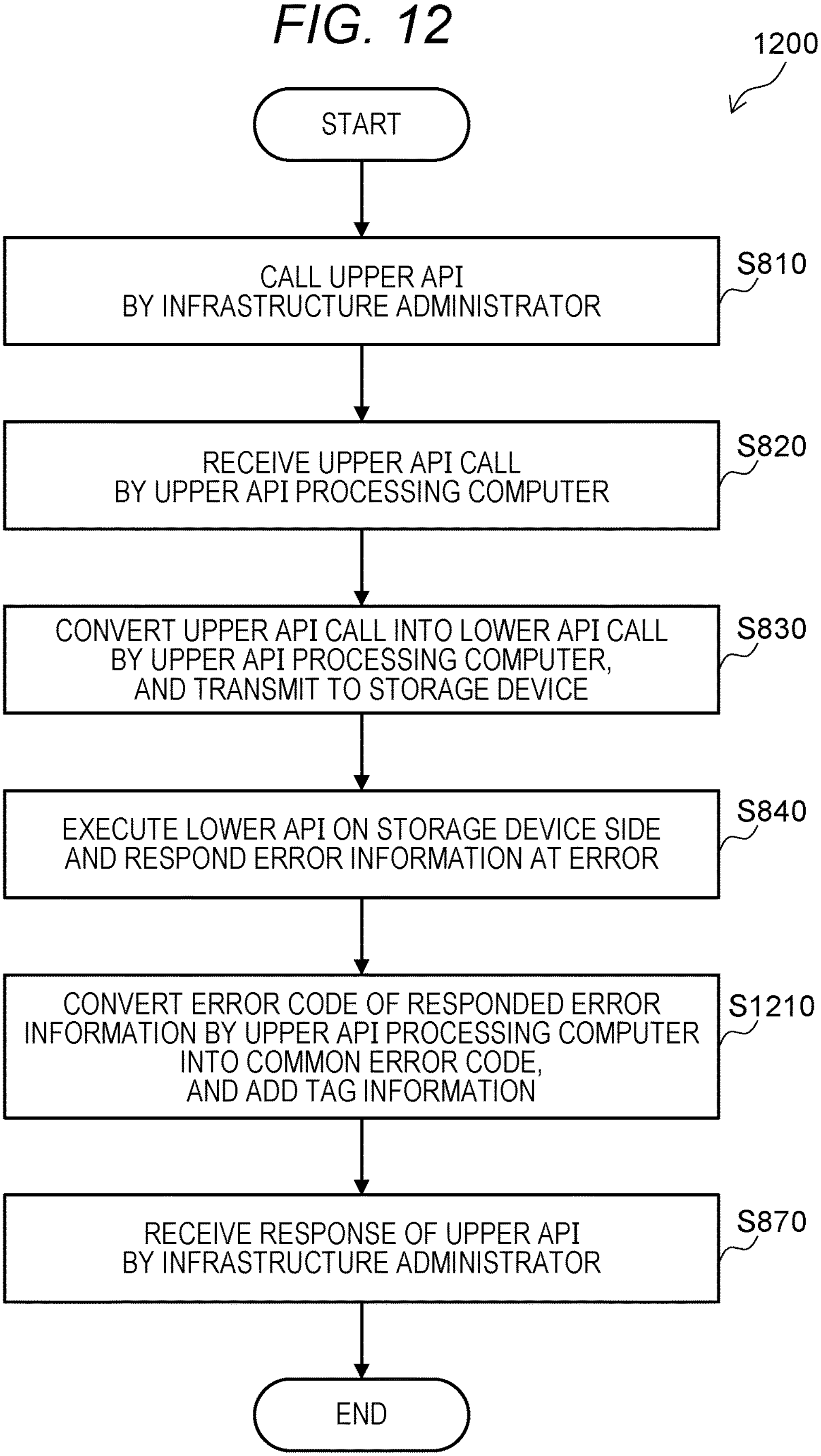
FIG. 12 is a flowchart illustrating API call/error response conversion processing according to the third embodiment.

FIG. 12 is a flowchart illustrating API call/error response conversion processing according to the third embodiment.

An API call/error response conversion flow 1200 executes step S1210 instead of steps S850 and S860 in the API call/error response conversion flow 800.

In step S1210, the upper API processing program 221 converts the error information of the responded lower API call. At that time, tag information corresponding to the error code created in step S1120 is added to the converted error information.

In the present embodiment, the infrastructure administrator 150 refers to the tag of the error information in the response of the upper API, and can grasp the classification of the error such as "volume" or "blockaded". This tag type is expected to be less than the number of error codes, reducing the number of error codes that the infrastructure administrator should consider.

Although the embodiments according to the present disclosure have been described in detail above, the present disclosure is not limited to the above-described embodiments, and various modifications can be made without departing from the gist of the present disclosure. For example, the above-mentioned embodiments of the present invention have been described in detail in a clearly understandable way, and are not necessarily limited to those having all the described configurations. In addition, some of the configurations of the above-mentioned embodiments may be omitted, replaced with other configurations, and added to other configurations.

In addition, some or all of the configurations, functional units, and processing units described above may be realized in hardware such as an integrated circuit. In addition, the configurations and the functions described above may be realized in software such that a processor analyzes and performs a program which realizes each function. Information such as a program, a table, and a file for achieving each function can be stored in a storage device such as a memory, an HDD, or an SSD, or a recording medium such as an integrated circuit (IC) card, a secure digital (SD) card, or a digital versatile disc (DVD).

Further, in the drawings described above, only control lines and information lines considered to be necessary for explanation are illustrated, but not all the control lines and the information lines for mounting are illustrated. For example, in practice, almost all the configurations may be considered to be connected to each other.

In addition, the above-mentioned arrangement forms of the processing functions and data are merely examples. The arrangement form of each processing function and data can be changed to an optimum arrangement form from the viewpoint of performance of hardware and software, processing efficiency, communication efficiency, and the like.

What is claimed is:

1. A management system of a storage device that provides an application programming interface (API) for operating a plurality of storage devices, the management system comprising:

a processor; and a storage unit, wherein the storage unit holds correspondence information indicating a correspondence relationship between specific error information indicating error information in a specific format for each model of the storage device and common error information indicating error information in a common format among models of the storage device, and the processor is configured to:

call and execute the API with respect to the storage device in response to a call request from a terminal;

when the specific error information is responded from the API in response to the call request, convert the specific error information into the common error information on a basis of the correspondence information; and respond the converted common error information to the terminal, wherein the processor is configured to:

store, in the storage unit, a log related to the specific error information responded from the API in response to the call request;

extract, from the log, the specific error information for each of a plurality of the storage devices, the specific error information having been responded to a same call request from the API of the storage device; and generate the correspondence information by associating a same common error information with the extracted specific error information of each storage device.

2. A management system of a storage device that provides an application programming interface (API) for operating a plurality of storage devices, the management system comprising:

a processor; and a storage unit, wherein the storage unit holds correspondence information indicating a correspondence relationship between specific error information indicating error information in a specific format for each model of the storage device and common error information indicating error information in a common format among models of the storage device, and the processor is configured to:

call and execute the API with respect to the storage device in response to a call request from a terminal;

when the specific error information is responded from the API in response to the call request, convert the specific error information into the common error information on a basis of the correspondence information; and respond the converted common error information to the terminal, wherein the processor is configured to:

extract a meaning of the common error information from a character string related to the specific error information for each storage device in a specific document; and generate the correspondence information by associating the extracted meaning with the specific error information.

3. A management system of a storage device that provides an application programming interface (API) for operating a plurality of storage devices, the management system comprising:

a processor; and a storage unit, wherein the storage unit holds correspondence information indicating a correspondence relationship between specific error information indicating error information in a specific format for each model of the storage device and common error information indicating error information in a common format among models of the storage device, and the processor is configured to:

call and execute the API with respect to the storage device in response to a call request from a terminal;

when the specific error information is responded from the API in response to the call request, convert the specific error information into the common error information on a basis of the correspondence information; and respond the converted common error information to the terminal, wherein the processor is configured to:

perform natural language processing on a character string related to the specific error information in a specific document to determine similarity in a meaning of the specific error information; and generate the correspondence information by associating a same common error information with a plurality of pieces of the specific error information having similar meanings.

4. A management system of a storage device that provides an application programming interface (API) for operating a plurality of storage devices, the management system comprising:

a processor; and a storage unit, wherein the storage unit holds correspondence information indicating a correspondence relationship between specific error information indicating error information in a specific format for each model of the storage device and common error information indicating error information in a common format among models of the storage device, and the processor is configured to:

call and execute the API with respect to the storage device in response to a call request from a terminal;

when the specific error information is responded from the API in response to the call request, convert the specific error information into the common error information on a basis of the correspondence information; and respond the converted common error information to the terminal, wherein the storage unit holds hierarchical structure information indicating a hierarchical structure of the common error information, and the processor adds the common error information of an upper hierarchy of the common error information to the common error information converted from the specific error information on a basis of the hierarchical structure information, and responds to the terminal.

5. The management system according to claim 4, wherein the processor is configured to:

store, in the storage unit, a log related to the specific error information responded from the API in response to the call request;

extract, from the log, a plurality of pieces of the specific error information of each of the storage devices, the plurality of pieces of the specific error information having been responded to a plurality of the call requests from the APIs of the plurality of storage devices;

specify an inclusion relationship in which one piece of the specific error information includes another piece of the specific error information on a basis of the plurality of pieces of the extracted specific error information; and generate the hierarchical structure information on a basis of a hierarchical structure of the specific error information based on the inclusion relationship.

6. The management system according to claim 5, wherein the processor is configured to:

extract meanings of a plurality of pieces of the specific error information extracted from the log;

specify an inclusion relationship in which one piece of the specific error information includes another piece of the specific error information on a basis of the extracted meaning; and generate the hierarchical structure information on a basis of a hierarchical structure of the specific error information based on the inclusion relationship.

7. The management system according to claim 4, wherein the processor is configured to:

store, in the storage unit, a log related to the specific error information responded from the API in response to the call request;

extract, from the log, a plurality of pieces of the specific error information of each of the storage devices, the plurality of pieces of the specific error information having been responded to a plurality of the call requests from the APIs of the plurality of storage devices, specify an inclusion relationship in which one piece of the specific error information includes another piece of the specific error information on a basis of the plurality of pieces of the extracted specific error information, and generate first hierarchical structure information as the hierarchical structure information on a basis of a hierarchical structure of the specific error information based on the inclusion relationship;

perform natural language processing on a character string related to a plurality of pieces of the specific error information of each of the storage devices, the character string having been responded to a plurality of the call requests from the APIs of the plurality of storage devices, extract a meaning of the specific error information, specify an inclusion relationship in which one piece of the specific error information includes another piece of the specific error information on a basis of similarity of the meaning, and generate second hierarchical structure information as the hierarchical structure information on a basis of a hierarchical structure of the specific error information based on the inclusion relationship; and add the common error information of an upper hierarchy of the common error information to the common error information converted from the specific error information on a basis of the first hierarchical structure information and the second hierarchical structure information, and respond to the terminal.

8. A management system of a storage device that provides an application programming interface (API) for operating a plurality of storage devices, the management system comprising:

a processor; and a storage unit, wherein the storage unit holds correspondence information indicating a correspondence relationship between specific error information indicating error information in a specific format for each model of the storage device and common error information indicating error information in a common format among models of the storage device, and the processor is configured to:

call and execute the API with respect to the storage device in response to a call request from a terminal;

when the specific error information is responded from the API in response to the call request, convert the specific error information into the common error information on a basis of the correspondence information; and respond the converted common error information to the terminal, wherein the processor is configured to:

extract meanings of a plurality of pieces of the specific error information responded from the APIs of the plurality of storage devices with respect to a plurality of the call requests;

create tag information from a part of speech having a high appearance frequency in the meaning; and add the tag information to the common error information converted from the specific error information and respond to the terminal.

9. A management system of a storage device that provides an application programming interface (API) for operating a plurality of storage devices, the management system comprising:

a processor; and a storage unit, wherein the storage unit holds correspondence information indicating a correspondence relationship between specific error information indicating error information in a specific format for each model of the storage device and common error information indicating error information in a common format among models of the storage device, and the processor is configured to:

call and execute the API with respect to the storage device in response to a call request from a terminal;

when the specific error information is responded from the API in response to the call request, convert the specific error information into the common error information on a basis of the correspondence information; and respond the converted common error information to the terminal, wherein the processor is configured to:

store, in the storage unit, a log related to the specific error information responded from the API in response to the call request;

extract, from the log, the specific error information of each of a plurality of the storage devices, the specific error information having been responded to a same call request from the API, associate a same common error information with the extracted specific error information of each of the storage devices, and generate first correspondence information as the correspondence information;

perform natural language processing on a character string related to the specific error information in a specific document to extract a meaning of the specific error information, determine similarity of the meaning, associate the same common error information with a plurality of pieces of the specific error information having similar meanings, and generate second correspondence information as the correspondence information; and convert the specific error information into the common error information on a basis of the first correspondence information and the second correspondence information.

* * * * *